United States Patent [19]

Hommeltoft

[11] Patent Number: 5,959,169
[45] Date of Patent: Sep. 28, 1999

[54] PROCESS FOR THE REMOVAL OF AROMATIC

[75] Inventor: Sven Ivar Hommeltoft, Hillerød, Denmark

[73] Assignee: Haldor Topsoe A/S, Lyngby, Denmark

[21] Appl. No.: 09/053,928

[22] Filed: Apr. 2, 1998

[30] Foreign Application Priority Data

Apr. 9, 1997 [DK] Denmark ................. 0398/97

[51] Int. Cl.$^6$ ................. C07C 2/66; C07C 2/70
[52] U.S. Cl. ................. 585/458; 585/462
[58] Field of Search ................. 585/458, 462

[56] References Cited

U.S. PATENT DOCUMENTS 4,613,723  9/1986  Olah ................. 585/730

*Primary Examiner*—Walter D. Griffin
*Assistant Examiner*—Tam M. Nguyen
*Attorney, Agent, or Firm*—Ostrolenk, Faber, Gerb & Soffen, LLP

[57] ABSTRACT

Process for the selective removal of aromatic compounds from a hydrocarbon mixture by contacting the mixture in presence of an olefinic alkylating agent with an alkylation catalyst selected from the group of fluorinated alkyl sulphonic acids movably adsorbed on a silica comprising carrier material.

4 Claims, No Drawings

PROCESS FOR THE REMOVAL OF AROMATIC

The present invention relates to a process for the removal of toxic aromatic compounds and in particular removal of benzene from a hydrocarbon mixture by selective alkylation of the compounds to less toxic alkylated derivates.

It is known to alkylate aromatic hydrocarbons with olefins or alcohols in presence of a Lewis acid or sulphuric acid.

Sulphuric acid disadvantageously sulphonates aromatic compounds. Also various solid acids including zeolites are known to catalyze the alkylation of aromatic compounds with olefins.

It has been observed that aliphatic hydrocarbons are alkylated selectively with olefins in presence of trifluoromethanesulphonic acid supported as a moveable catalyst zone, which migrates through a reactor during the alkylation reaction (U.S. Pat. No. 5,220,095). No sulphonation of aromatic compounds was observed.

It has now been found that alkylation of aromatic compounds can be carried out in the presence of excess of isobutane by an alkylation process similar to the process described in U.S. Pat. No. 5,220,095. Thereby, the toxic and carcinogenic aromatic compounds are selectively converted to less noxious alkyl aromatic compounds. Alkylation of the aromatic compounds can be carried out in the presence of isoalkanes, whereby aromatic compounds are converted to mixtures of mono-alkylaromatic and poly-alkyl-aromatic compounds.

In accordance with the above findings this invention provides a process for the selective removal of aromatic compound from a hydrocarbon mixture by contacting the mixture in presence of an olefinic alkylating agent with an alkylation catalyst selected from the group of fluorinated alkyl sulphonic acids movably adsorbed on a silica comprising carrier material.

Alkylation of benzene in a mixture of benzene with aliphatic hydrocarbons is of particular interest. The C6 cut from reformate gasoline represents such a mixture and a considerable amount of the light aromatic compounds are by the process according to the invention alkylated to higher boiling alkyl-aromatic compounds fraction without significantly changing the content of aliphatic compounds. The products from the alkylation of benzene with propylene or butene in the presence of isobutane boil in the gasoline or in the kerosene range and essentially no products having a boiling point above 270° C. are formed.

DETAILED DESCRIPTION OF THE INVENTION

In a specific embodiment of the invention benzene is alkylated with an olefin by feeding a mixture of the olefin dissolved in benzene to a reactor consisting of a 6 m ¼" tube (volume=100 ml) loaded with silica gel (Merck 100, 0.2–0.5 mm) on which a catalyst zone containing 6 ml of trifluoromethanesulphonic acid is supported.

The reactor was submerged in a water bath for temperature control. The temperature of the bath is maintained at 40° C. The reaction zone moves through the bed as the reaction proceeds, which is observed by temperature measurements.

Alkylation of C6-cut from reformate:

70% of a C6-cut from reformate were mixed with 30% (w/w) propene and alkylated in the reactor described above. A part of the reactor effluent was recycled to the reactor inlet. The feed flow was approximately 3.2 g/min. and the effluent recycle flow approximately 14 g/min. The reaction was performed at a bath temperature of 40° C. The composition of the feed and alkylated product obtained by this Example are summarized in the Table below. All results are given in % (w/w) relative to the amount of reformate in the feed.

|  | Reformate feed | Alkylate Product |
|---|---|---|
| C5–C6 aliphatics | 63.2 | 63.7 |
| C9+ aliphatics | 0.0 | 0.9 |
| Benzene | 33.5 | 10.3 |
| Toluene | 3.4 | 0.5 |
| C9+ aromatic compounds | 0.0 | 62.8 |
| Total | 100.0 | 138.2 |

I claim:

1. Process for the selective removal of aromatic compounds from a hydrocarbon mixture containing also aliphatic hydrocarbons by contacting the mixture in the presence of an olefinic alkylating agent with an alkylation catalyst consisting of a fluorinated alkyl sulphonic acid moveably adsorbed on a silica containing carrier material.

2. The process of claim 1, wherein the aromatic compound comprises benzene.

3. The process of claim 1, wherein the fluorinated alkyl sulphonic acid is trifluoromethanesulphonic acid.

4. The process of claim 2, wherein the fluorinated alkyl sulphonic acid is trifluoromethanesulphonic acid.

* * * * *